(12) United States Patent
Rawlings (10) Patent No.: US 12,535,115 B2
(45) Date of Patent: Jan. 27, 2026

(54) ELASTOMERIC BUSHING

(71) Applicant: The Pullman Company LLC, Northville, MI (US)

(72) Inventor: Scott W. Rawlings, North Ridgeville, OH (US)

(73) Assignee: The Pullman Company LLC, Northville, MI (US)

( * ) Notice: Subject to any disclaimer, the term of this patent is extended or adjusted under 35 U.S.C. 154(b) by 143 days.

(21) Appl. No.: 18/157,532

(22) Filed: Jan. 20, 2023

(65) Prior Publication Data

US 2024/0247699 A1    Jul. 25, 2024

(51) Int. Cl.
     *F16F 1/393*      (2006.01)
     *F16F 1/38*      (2006.01)
     *F16F 1/387*      (2006.01)

(52) U.S. Cl.
     CPC ........... *F16F 1/393* (2013.01); *F16F 1/3828* (2013.01); *F16F 1/3856* (2013.01); *F16F 1/3873* (2013.01); *F16F 2224/025* (2013.01); *F16F 2234/02* (2013.01)

(58) Field of Classification Search
     CPC ...... F16F 1/3821; F16F 1/3828; F16F 1/3873; F16F 1/393
     USPC ............................................ 267/141.3, 141.7
     See application file for complete search history.

(56) References Cited

U.S. PATENT DOCUMENTS

| | | | | |
|---|---|---|---|---|
| 4,883,260 A | * | 11/1989 | Kanda | F16F 13/14 280/124.13 |
| 5,190,269 A | * | 3/1993 | Ikeda | F16F 1/387 267/152 |
| 5,702,094 A | * | 12/1997 | McLelland | F16F 13/14 267/140.12 |
| 6,672,574 B2 | * | 1/2004 | Hamada | F16F 13/1463 267/140.12 |
| 9,752,637 B2 | * | 9/2017 | Kuki | F16F 1/393 |
| 9,976,618 B2 | * | 5/2018 | Eguchi | F16F 1/38 |

(Continued)

FOREIGN PATENT DOCUMENTS

| | | | | |
|---|---|---|---|---|
| CN | 206522398 U | * | 9/2017 | ................ F16F 7/00 |
| CN | 209581061 U | | 11/2019 | |

(Continued)

*Primary Examiner* — Thomas J Williams
(74) *Attorney, Agent, or Firm* — Harness, Dickey & Pierce, P.L.C.

(57) ABSTRACT

An elastomeric bushing includes an inner sleeve, a travel limiter disposed around the inner sleeve, an elastomeric bumper disposed around and directly engaging the travel limiter, and an outer sleeve disposed around the inner sleeve, the travel limiter and the elastomeric bumper. The outer sleeve is spaced apart from the inner sleeve and directly engages the elastomeric bumper. The travel limiter includes a radially outwardly extending first protrusion and a diametrically opposed radially outwardly extending second protrusion. A first portion of the elastomeric bumper is bounded by a first reduced diameter portion of the outer sleeve and the first and second protrusions. A second portion of the elastomeric bumper is bounded by a second reduced diameter portion of the outer sleeve and the first and second protrusions. The elastomeric bumper includes diametrically opposed voids axially extending therethrough. The voids are circumferentially rotated relative to the first and second protrusions.

19 Claims, 5 Drawing Sheets

(56) References Cited

U.S. PATENT DOCUMENTS

| | | | |
|---|---|---|---|
| 10,359,091 B2* | 7/2019 | Satou | F16F 15/08 |
| 11,433,725 B2 | 9/2022 | Sano et al. | |
| 2018/0135716 A1* | 5/2018 | Zimmerman | F16F 1/3842 |
| 2021/0016623 A1* | 1/2021 | Kim | B60G 7/001 |
| 2021/0396295 A1* | 12/2021 | Rawlings | F16F 13/1463 |
| 2022/0196107 A1* | 6/2022 | Gaspar | F16F 13/1409 |
| 2024/0247699 A1* | 7/2024 | Rawlings | F16F 1/3856 |

FOREIGN PATENT DOCUMENTS

| | | | |
|---|---|---|---|
| CN | 214028112 U | 8/2021 | |
| CN | 215244202 U | 12/2021 | |
| KR | 20020040052 A | 5/2002 | |
| KR | 100908173 B1 | 7/2009 | |
| WO | WO-03010444 A1 | 2/2003 | |
| WO | WO-2010006597 A1* | 1/2010 | F16F 13/14 |

* cited by examiner

ELASTOMERIC BUSHING

FIELD

The present disclosure relates to an elastomeric bushing for coupling a component to a vehicle. More particularly, the present disclosure relates to an elastomeric bushing configured to function in a high axial load and angularly movable environment.

BACKGROUND

The statements in this section merely provide background information related to the present disclosure and may not constitute prior art.

Vehicles that travel over a road surface may be equipped with an independent front suspension, an independent rear suspension, or both. The independent suspension may include an upper control arm, a lower control arm, and a hub or knuckle which supports a tire of the vehicle. Each control arm is attached to the frame or other structural component of the vehicle using one or more elastomeric bushings. The elastomeric bushings may consist of an outer metal tube which is pressed into the control arm. A layer of elastomer is positioned within the outer metal housing. An inner metal housing extends through the center of the elastomer. The outer metal housing may be attached to a bracket on the frame. A bolt extends through the inner metal housing and secures the control arm to the frame. As the vehicle travels, relative movement between sprung and unsprung portions of the vehicle is accommodated by flexing of a coil spring, a torsion bar, an air spring or by a similarly resilient device. The flexing of the resilient device causes the ends of the control arms to pivot on both of the elastomeric bushings which secure the control arms to the sprung portion of the vehicle.

The elastomeric bushings are used to facilitate this pivotal motion and to isolate the vehicle from shock. The layer of elastomer located between the inner and outer metal housings effectively isolates the sprung portion of the vehicle from the unsprung portion of the vehicle.

While these elastomeric bushings have performed satisfactorily in the field, a need for an alternate design exists. It may be beneficial to develop an elastomeric bushing including an internal travel limiter that defines a maximum amount of axial travel between an inner sleeve and an outer sleeve. It may be beneficial to achieve such a function using internal geometry of the elastomeric bushing without relying on elastomeric material being positioned external to the bushing components to expand the capabilities of the elastomeric bushing, improve the strength and durability of the bushing while minimizing manufacturing costs associated with the new elastomeric bushing.

SUMMARY

An elastomeric bushing includes an inner sleeve, a travel limiter disposed around and directly engaging the inner sleeve, an elastomeric bumper disposed around and directly engaging the travel limiter, and an outer sleeve disposed around the inner sleeve, the travel limiter and the elastomeric bumper. The outer sleeve is spaced apart from the inner sleeve and directly engages the elastomeric bumper. The travel limiter includes a radially outwardly extending first protrusion and a diametrically opposed radially outwardly extending second protrusion. A first portion of the elastomeric bumper is bounded by a first reduced diameter portion of the outer sleeve and the first and second protrusions. A second portion of the elastomeric bumper is bounded by a second reduced diameter portion of the outer sleeve and the first and second protrusions. The elastomeric bumper includes diametrically opposed voids axially extending therethrough. The voids are circumferentially rotated relative to the first and second protrusions.

In another arrangement an elastomeric bushing includes an inner sleeve, a travel limiter disposed around and directly engaging the inner sleeve, an elastomeric bumper disposed around and directly engaging the travel limiter, and an outer sleeve disposed around the inner sleeve, the travel limiter and the elastomeric bumper. The outer sleeve is spaced apart from the inner sleeve and directly engages the elastomeric bumper. The travel limiter includes a radially outwardly extending first protrusion and a radially outwardly extending second protrusion. The outer sleeve includes first and second reduced diameter portions positioned at opposite distal ends of the outer sleeve. A first portion of the elastomeric bumper is trapped between the first reduced diameter portion of the outer sleeve and the first protrusion. A second portion of the elastomeric bumper being trapped between the second reduced diameter portion of the outer sleeve and the second protrusion to restrict relative axial movement between the inner sleeve and the outer sleeve. The elastomeric bumper includes first and second circumferentially spaced apart voids axially extending therethrough. The travel limiter is radially moveable to at least partially close the voids.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An exemplary embodiment elastomeric bushing will now be described more fully with reference to the accompanying drawings with the elastomeric bushing being identified at reference numeral 10.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-6, elastomeric bushing 10 may be utilized to interconnect one or more control arms such as a front suspension lower control arm to a vehicle body or frame (not shown). Elastomeric bushing 10 defines a longitudinal axis 12 that may be oriented vertically relative to the ground when elastomeric bushing 10 is mounted in a vehicle.

Elastomeric bushing 10 is an assembly comprising an inner sleeve 14, a travel limiter 16, an elastomeric bumper 18, and an outer sleeve 20. Inner sleeve 14 is a metallic member, preferably constructed from a mild steel such as SAE J403 1008-1010. Inner sleeve 14 includes a through bore 24 for receipt of a fastener (not shown) to interconnect elastomeric bushing 10 to a vehicle component such as a control arm. Through bore 24 extends from a first end face 26 positioned at a first end 28 to a second end face 32 positioned at a second end 34 of inner sleeve 14.

Figure 1:
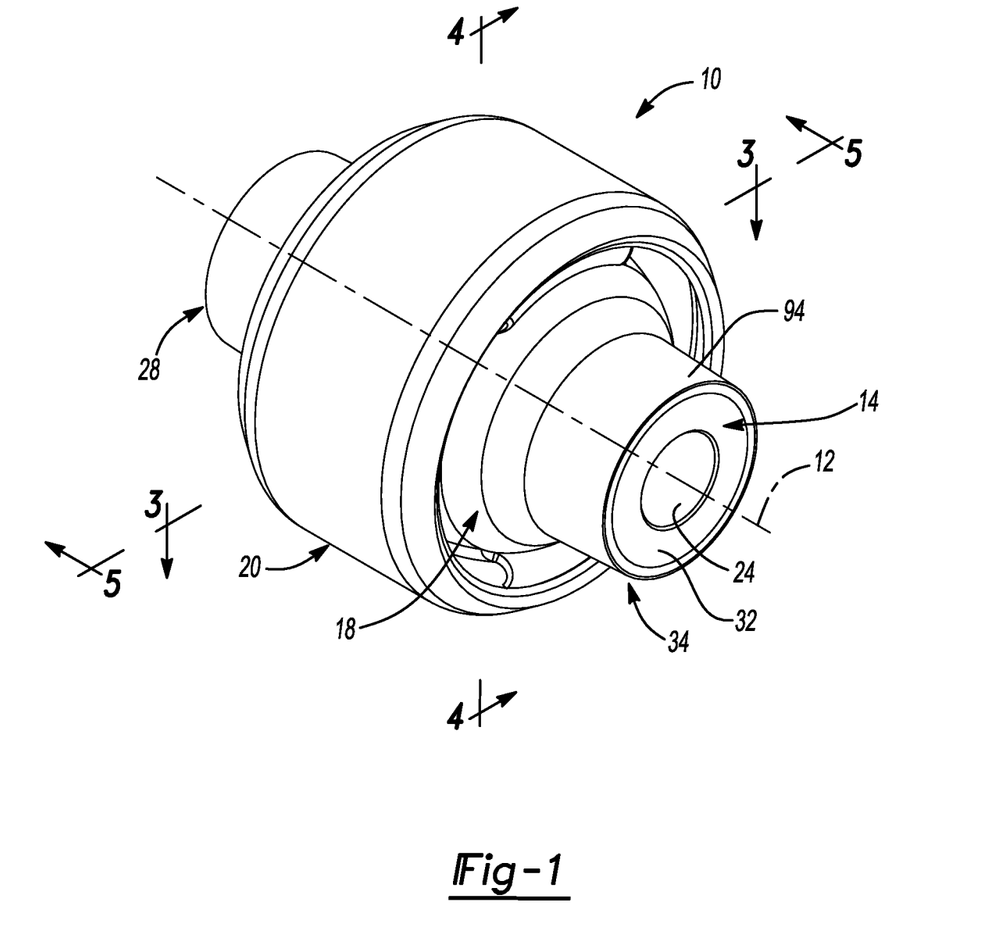
FIG. 1 is a perspective view of an exemplary elastomeric bushing constructed in accordance with the teachings of the present disclosure.
Figure 2:
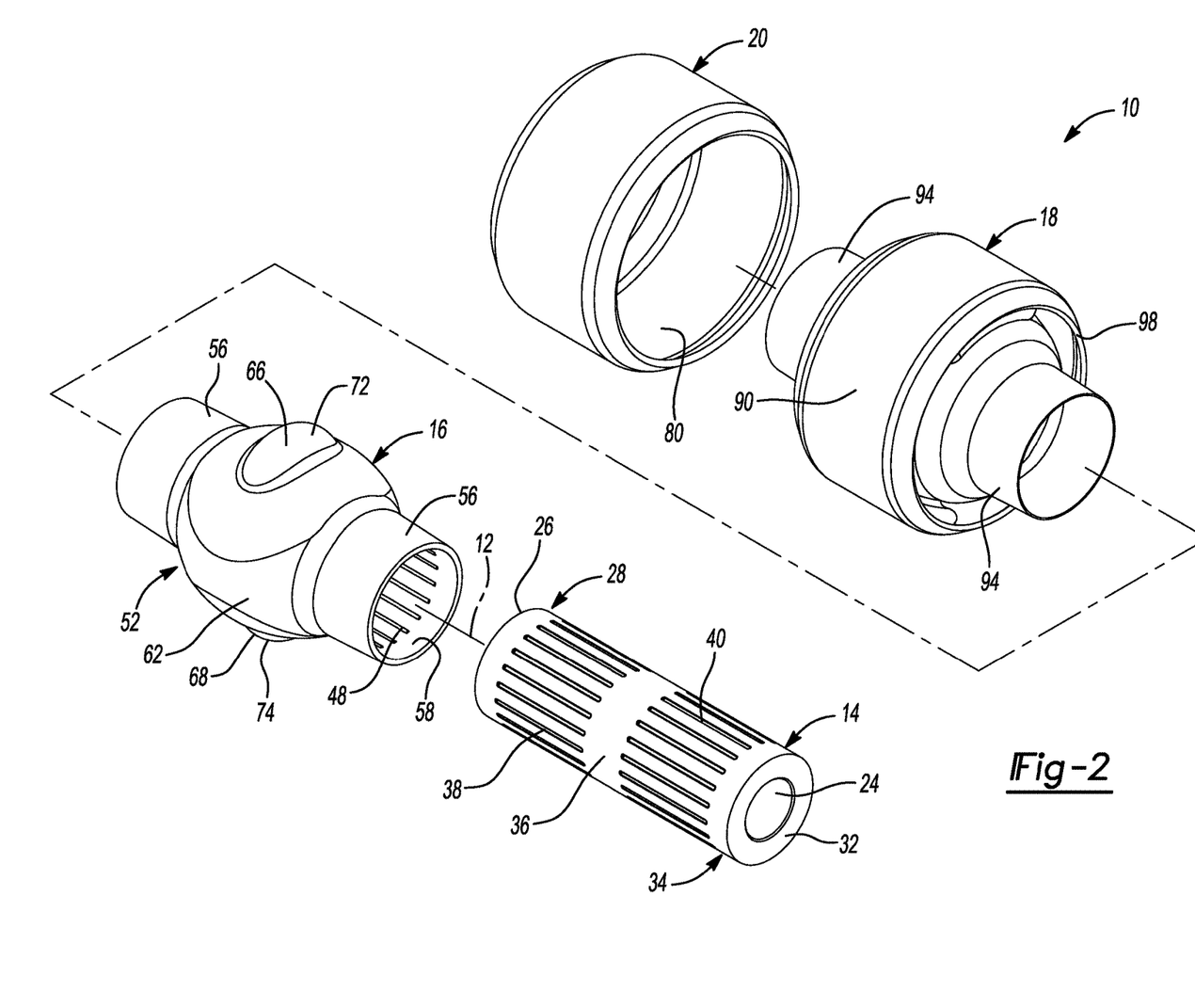
FIG. 2 is an exploded perspective view of the elastomeric bushing depicted in FIG. 1.

Inner sleeve 14 includes a cylindrically shaped outer surface 36 interrupted by a plurality of circumferentially spaced apart and axially extending grooves 38. Another set of circumferentially spaced apart and axially extending grooves 40 may be positioned on outer surface 36 at an axially spaced apart from location from grooves 38. As some portions of inner sleeve 14 may be exposed to the environment, the exterior surfaces of inner sleeve 14 may be treated with a zinc-nickel plating.

Travel limiter 16 may be constructed as an injection molded plastic component bonded to outer surface 36 of inner sleeve 14. During the injection molding process, molten plastic surrounds outer surface 36 and enters grooves 38, 40 to form a plurality of radially inwardly extending protrusions 44 cooperating with grooves 38 and another set of circumferentially spaced apart and inwardly extending protrusions 48 cooperating with grooves 40. This mechanical interconnection assists with maintaining the as-molded relative position between travel limiter 16 and inner sleeve 14.

Travel limiter 16 includes a central body portion 52 with two integrally formed thin wall substantially cylindrically shaped portions 56 positioned on opposite sides of central body portion 52. A cylindrically shaped through bore is defined by an inner surface 58. An outer surface 62 of central body portion 52 is substantially spherically shaped. A pair of diametrically opposed protrusions 66, 68 radially outwardly extend from outer surface 62. Each protrusion 66, 68 includes a spherically shaped contact surface 72, 74, respectively. Travel limiter 16 may be formed from a plastic material such as 30% glass filled nylon 6/6.

During manufacture of elastomeric bushing 10, it is contemplated that travel limiter 16 is injection molded and bonded to inner sleeve 14 to define a sub-assembly. Subsequently, outer sleeve 20 and the sub-assembly of travel limiter 16 and inner sleeve 14 are positioned into an injection mold in a spaced apart relationship. A liquid elastomer, such as natural rubber, is injected into the mold to bond elastomeric bumper 18 to outer surface 62 of travel limiter 16 and a cylindrical inner surface 80 of outer sleeve 20. Tooling inserts (not shown) are also inserted into the mold prior to injecting the liquid elastomer. The inserts are used to define a first void 84 and a second void 86 within elastomeric bumper 18.

Figure 6:
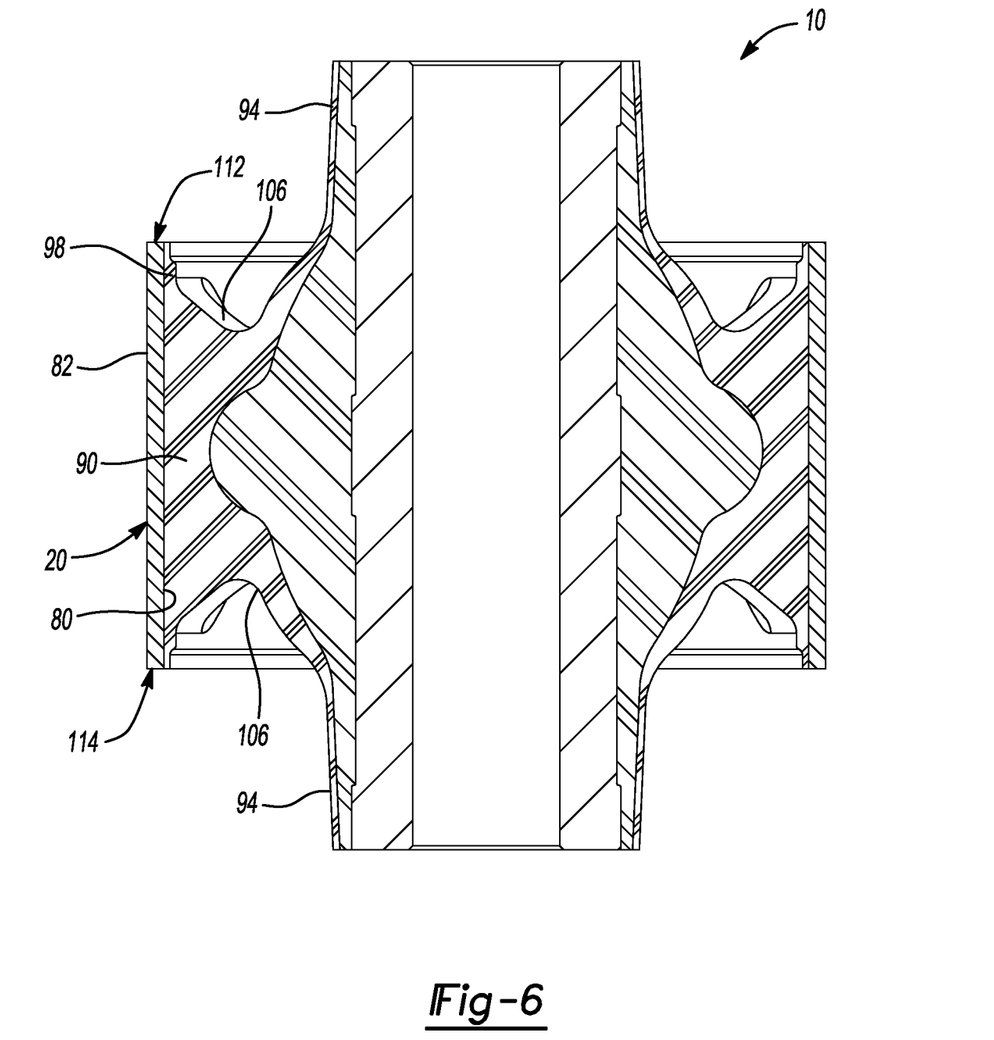
FIG. 6 is a cross-sectional view of a work-in-process elastomeric bushing prior to mechanically deforming opposite ends of the outer sleeve.

FIG. 6 depicts a work-in-process level assembly of elastomeric bumper 18 bonded to travel limiter 16 and outer sleeve 20. It should be noted that outer sleeve 20 is shaped substantially as a hollow right circular cylinder having cylindrical inner surface 80 and an outer surface 82 that is also cylindrical in shape prior to a mechanical deformation process such as swaging.

Once solidified, elastomeric bumper 18 includes a central body portion 90 with two integrally formed thin wall substantially cylindrically shaped portions 94 on opposite sides of central body portion 90. An outer web portion 98 circumferentially extends in direct bonded engagement with inner surface 80 of outer sleeve 20. Elastomeric bumper 18 also includes an inner web portion 102 (FIG. 5) circumferentially extending about and in direct contact with travel limiter 16. In the zones where voids 84 and 86 are present, inner web portion 102 is radially spaced apart from outer web portion 98.

As best shown in FIG. 6, elastomeric bumper 18 further includes annular recesses 106 radially positioned between outer web portion 98 and thin wall cylindrical portions 94 on opposing axial sides of central body portion 90. FIG. 6 depicts the as molded, work-in-process configuration of elastomeric bushing 10 prior to mechanically deforming outer sleeve 20.

Figure 3:
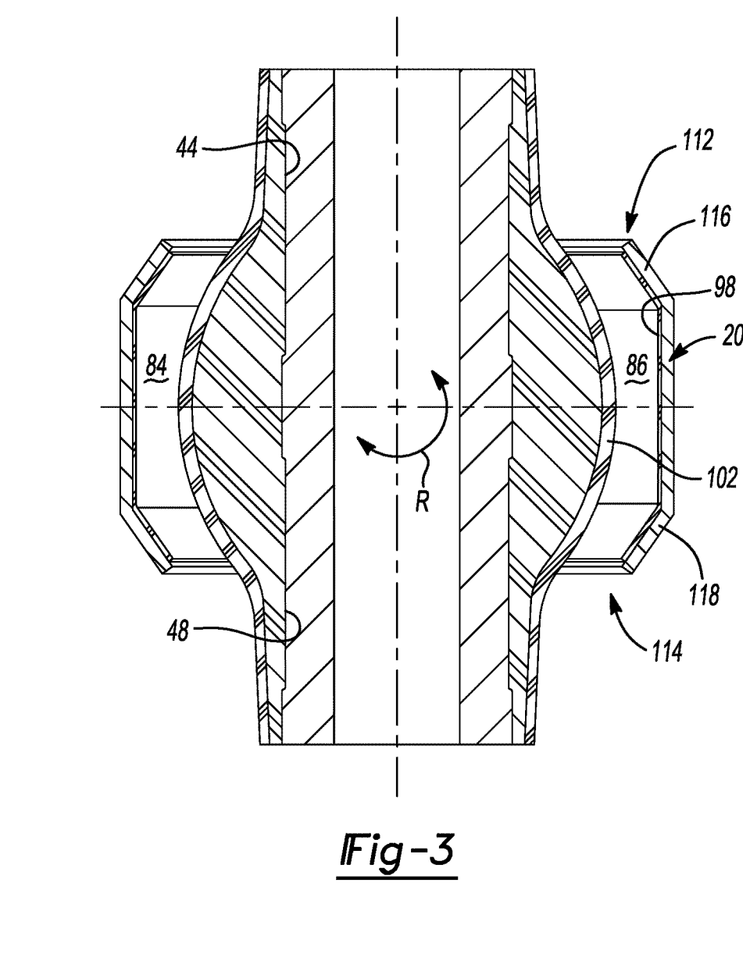
FIG. 3 is a cross-sectional view taken through the elastomeric bushing depicted in FIG. 1 along section line 3-3.
Figure 4:
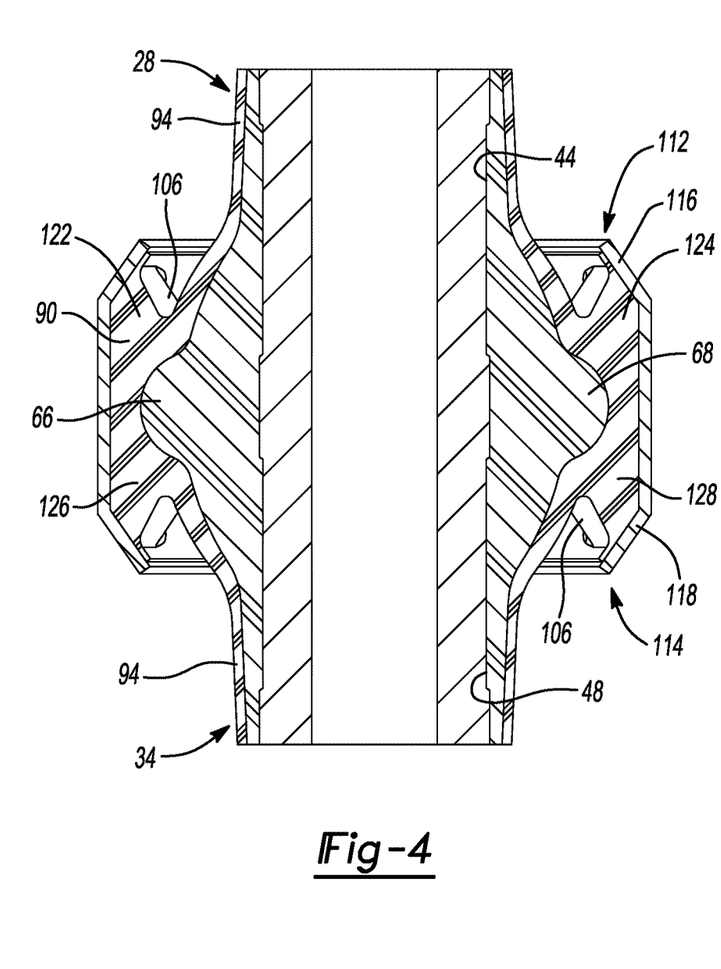
FIG. 4 is a cross-sectional view taken through the elastomeric bushing depicted in FIG. 1 along section line 4-4.

To complete the manufacture of elastomeric bushing 10, the work-in-process component depicted in FIG. 6 is processed such that an outer diameter of outer surface 82 is reduced. This step is optional and may impart desirable compressive residual stresses in elastomeric bumper 18. First and second ends 112, 114 of outer sleeve 20 are mechanically deformed or "swaged" in a radially inward direction to such an extent that first and second frustoconical portions 116, 118 are formed at the axial extremities of outer sleeve 20 as best shown in FIGS. 3 and 4. At this time, a first portion 122 of elastomeric bumper 18 is trapped between first frustoconical portion 116 and first protrusion 66. A second portion 124 of elastomeric bumper 18 is trapped between first frustoconical portion 116 and second protrusion 68. Similarly, a third portion 126 of elastomeric bumper 18 is trapped between second frustoconical portion 118 and first protrusion 66. A fourth portion 128 of elastomeric bumper 18 is trapped between second frustoconical portion 118 and second protrusion 68.

During operation of a vehicle equipped with elastomeric bushing 10, it is contemplated that loads applied to elastomeric bushing 10 during vehicle operation may occur in several directions individually or in combination. In particular, it is contemplated that inner sleeve 14 and outer sleeve 20 will be urged to move relative to one another in the radial direction substantially perpendicular to longitudinal axis 12. Based on the provision of voids 84 and 86, it is likely that a maximum magnitude of radial deflection will occur approximate these locations. It is also envisioned that loads applied to elastomeric bushing 10 will attempt to rotate inner sleeve 14 relative to outer sleeve 20 in either a clockwise or counterclockwise direction indicated in FIG. 3 at R. Sometimes, this rotational movement is described as conical rotation. During certain loading events, travel limiter 16 may be moved toward outer sleeve 20 to such an extent that outer web portion 98 is urged into contact with inner web portion 102. In at least one contemplated use of elastomeric bushing 10, relatively high axial loads may be applied attempting to axially translate inner sleeve 14 relative to outer sleeve 20.

Elastomeric bushing 10 is constructed to allow relative movement between inner sleeve 14 and outer sleeve 20 to a certain extent while resisting the relative motions at desired spring rates. It is also of great importance to assure that the structural integrity of each of the components is maintained over the life of the suspension assembly. To assure a robust bushing construction, maximum stresses within elastomeric bumper 18 are limited.

To assure that elastomeric bushing 10 appropriately reacts relatively high axial loads between inner sleeve 14 and outer sleeve 20, protrusions 66, 68 cooperate with frustoconical portions 116, 118 to trap central body portion 90 therebetween. Relative positioning of opposed protrusions 66, 68 and frustoconical portions 116, 118 imparts a compressive load to elastomeric bumper 18 during the axial loading condition. The elastomer used to construct elastomeric bumper 18 exhibits significantly higher fatigue life characteristics in compression loading as compared to shear or tensile loading.

Figure 5:
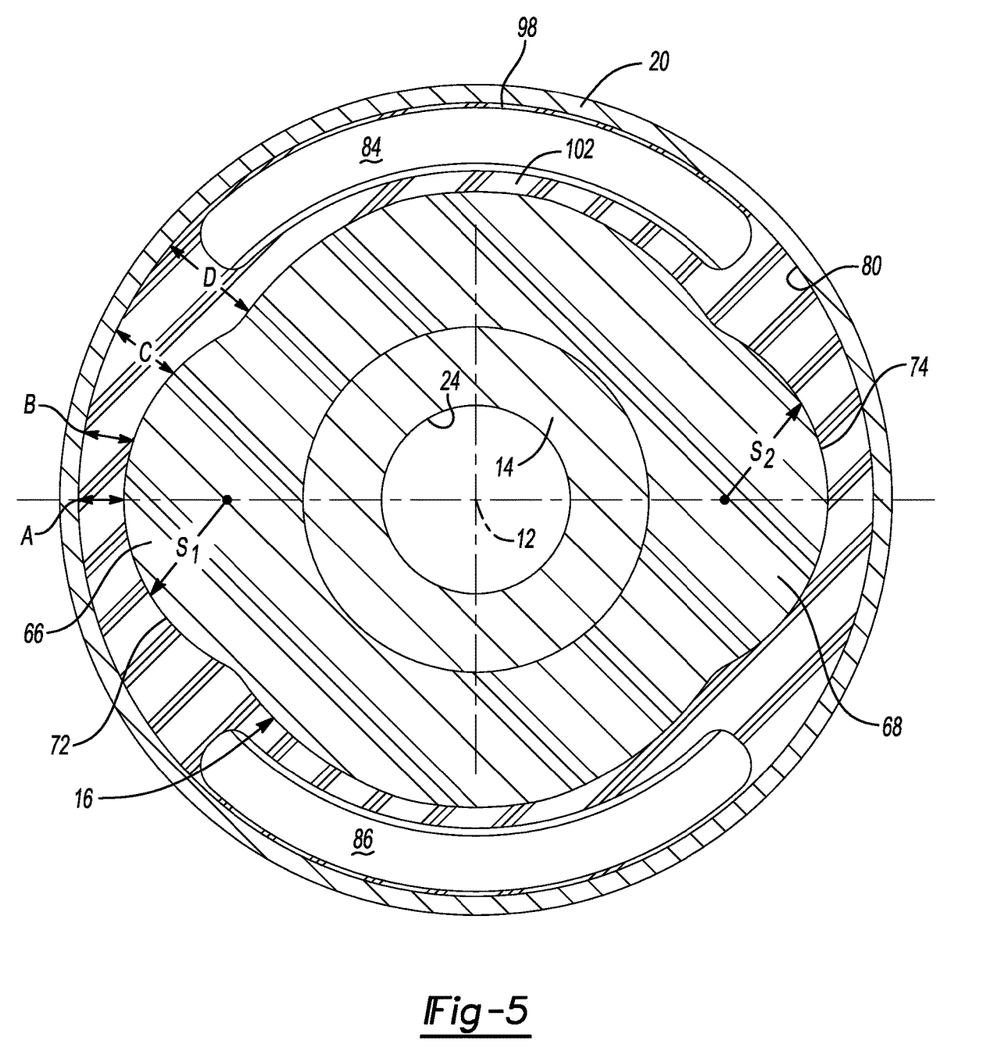
FIG. 5 is a cross-sectional view taken through the elastomeric bushing depicted in FIG. 1 along section line 5-5.

Another important feature of the elastomeric bumper in accordance with the teachings of the present disclosure includes further geometrical features limiting the maximum stress applied to elastomeric bumper 18 during operation. To assure certain stress and strain levels are not exceeded within elastomeric bumper 18, section thicknesses A, B, C and D are provided as depicted in FIG. 5. During load conditions encouraging axial movement of inner sleeve 14 relative to outer sleeve 20 or the relative rotation loading condition depicted in FIG. 3, the magnitude of movement between travel limiter 16 and outer sleeve 20 is greatest at location D, lesser at location C, lesser at location B and minimized at location A. Accordingly, the section thicknesses at each of these locations has a magnitude corresponding to the magnitude of movement associated with this position. A radial section thickness at location D is the greatest because this portion of the elastomeric bumper 18 will observe the greatest amount of relative travel between the adjacent non-elastomeric components. By providing a section thickness at location D having a larger magnitude than the section thicknesses at C, B and A, the maximum stresses induced within elastomeric bumper 18 at this location will not exceed a desired maximum. In similar fashion, section thicknesses at locations A, B, and C are proportional to the amount of relative deflection expected between travel limiter 16 and outer sleeve 20 at these positions.

It may be desirable to tune the damping characteristics of elastomeric bushing 10 utilizing the same concept. For example, it may be desirable to vary the magnitude of section thicknesses at locations A-D such that increase thicknesses lower the spring rate of the elastomer and reduced thicknesses would increase the spring rate. Additionally, it may be desirable to vary the radius of spherically shaped contact surfaces 72, 74 as identified in FIG. 5 at S1, S2 respectively. By varying the location of the center of the spherical surfaces 72, 74, thickness A will be changed. Other tuning opportunities exist such as varying the circumferential extent of voids 84, 86 and the spacing between outer web portion 98 and inner web portion 102.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. An elastomeric bushing comprising:
   an inner sleeve;
   a travel limiter disposed around and directly engaging the inner sleeve;
   an elastomeric bumper disposed around and directly engaging the travel limiter; and an outer sleeve disposed around the inner sleeve, the travel limiter and the elastomeric bumper, the outer sleeve being spaced apart from the inner sleeve and directly engaging the elastomeric bumper, wherein the travel limiter includes a radially outwardly extending first protrusion and a diametrically opposed radially outwardly extending second protrusion, the outer sleeve including first and second reduced diameter portions positioned at opposite distal ends of the outer sleeve, wherein a first portion of the elastomeric bumper includes compressive residual stresses at a position between the first reduced diameter portion of the outer sleeve and the first protrusion based on the first reduced diameter portion being in biased engagement with the first portion, a second portion of the elastomeric bumper including compressive residual stresses at a position between the second reduced diameter portion of the outer sleeve and the second protrusion based on the second reduced diameter portion being in biased engagement with the second portion of the elastomeric bumper, wherein the elastomeric bumper includes diametrically opposed voids axially extending therethrough, the voids being circumferentially rotated relative to the first and second protrusions.

2. The elastomeric bushing according to claim 1, wherein the travel limiter is a hollow cylindrically shaped one-piece monolithic component including the first and second protrusions.

3. The elastomeric bushing according to claim 1, wherein the first and second protrusions have the same cross-sectional shape.

4. The elastomeric bushing according to claim 1, wherein the elastomeric bumper includes an increasing thickness between the travel limiter and the outer sleeve beginning at a position radially aligned with one of the first and second protrusions and circumferentially travelling toward one of the voids.

5. The elastomeric bushing according to claim 1, wherein the voids of the elastomeric bumper are bounded by an outer web portion of the elastomeric bumper positioned adjacent to the outer sleeve and an inner web portion of the elastomeric bumper positioned adjacent to the travel limiter, a gap existing between the outer web portion and the inner web portion.

6. The elastomeric bushing according to claim 1, wherein the elastomeric bumper is bonded to the travel limiter and the outer sleeve.

7. The elastomeric bushing according to claim 1, wherein the inner sleeve is coaxially aligned with the outer sleeve.

8. The elastomeric bushing according to claim 1, wherein the travel limiter is symmetrical about two orthogonal planes when viewed in in cross-section.

9. The elastomeric bushing according to claim 1, wherein the inner sleeve axially extends beyond the outer sleeve at each end of the outer sleeve.

10. The elastomeric bushing according to claim 1, wherein the opposite distal ends of the outer sleeve radially inwardly extend in biased engagement with the elastomeric bumper.

11. An elastomeric bushing comprising:
an inner sleeve;
a travel limiter disposed around and directly engaging the inner sleeve;
an elastomeric bumper disposed around and directly engaging the travel limiter; and
an outer sleeve disposed around the inner sleeve, the travel limiter and the elastomeric bumper, the outer sleeve being spaced apart from the inner sleeve and directly engaging the elastomeric bumper, wherein the travel limiter includes a radially outwardly extending first protrusion and a radially outwardly extending second protrusion, the outer sleeve including first and second reduced diameter portions positioned at opposite distal ends of the outer sleeve, wherein a first portion of the elastomeric bumper is trapped between the first reduced diameter portion of the outer sleeve and the first protrusion, a second portion of the elastomeric bumper being trapped between the second reduced diameter portion of the outer sleeve and the second protrusion to restrict relative axial movement between the inner sleeve and the outer sleeve, wherein the elastomeric bumper includes first and second circumferentially spaced apart voids axially extending therethrough, the travel limiter being radially moveable into the voids, wherein the voids of the elastomeric bumper are bounded by an outer web portion of the elastomeric bumper positioned adjacent to the outer sleeve and an inner web portion of the elastomeric bumper positioned adjacent to the travel limiter, a gap existing between the outer web portion and the inner web portion.

12. The elastomeric bushing according to claim 11, wherein the elastomeric bumper includes an increasing thickness between the travel limiter and the outer sleeve beginning at a position radially aligned with one of the first and second protrusions and circumferentially travelling toward one of the voids.

13. The elastomeric bushing according to claim 11, wherein the elastomeric bumper is bonded to the travel limiter and the outer sleeve.

14. The elastomeric bushing according to claim 11, wherein the inner sleeve is coaxially aligned with the outer sleeve.

15. The elastomeric bushing according to claim 11, wherein the travel limiter is symmetrical about two orthogonal planes when viewed in in cross-section.

16. The elastomeric bushing according to claim 11, wherein the travel limiter is a hollow cylindrically shaped one-piece monolithic component including the first and second protrusions.

17. The elastomeric bushing according to claim 11, wherein the first and second protrusions have the same cross-sectional shape.

18. The elastomeric bushing according to claim 11, wherein the inner sleeve axially extends beyond the outer sleeve at each end of the outer sleeve.

19. The elastomeric bushing according to claim 11, wherein opposite ends of the outer sleeve are inwardly deformed in engagement with the elastomeric bumper.

* * * * *